US006008448A

United States Patent [19]

Peck

[11] Patent Number: 6,008,448

[45] Date of Patent: Dec. 28, 1999

[54] SOLAR PANEL ARRAY WITH STEPPED TAPER

[75] Inventor: Scott Owen Peck, Palo Alto, Calif.

[73] Assignee: Space Systems/Loral, Inc., Paco Alto, Calif.

[21] Appl. No.: 09/173,019

[22] Filed: Oct. 15, 1998

[51] Int. Cl.[6] .................... H01L 25/00

[52] U.S. Cl. .................... 136/245; 136/292; 244/173

[58] Field of Search .................... 136/245, 292; 244/173

[56] References Cited

U.S. PATENT DOCUMENTS 4,133,501 1/1979 Pentlicki .................... 244/173
5,196,857 3/1993 Chiappetta et al. .................... 343/881

*Primary Examiner*—Mark Chapman
*Attorney, Agent, or Firm*—Perman & Green, LLP

[57] ABSTRACT

A series of solar panels are assembled into an array for use as a source of solar power for a satellite. The panels are designed with diminishing thickness from the yoke to the tip to obtain a constant stress distribution.

4 Claims, 2 Drawing Sheets

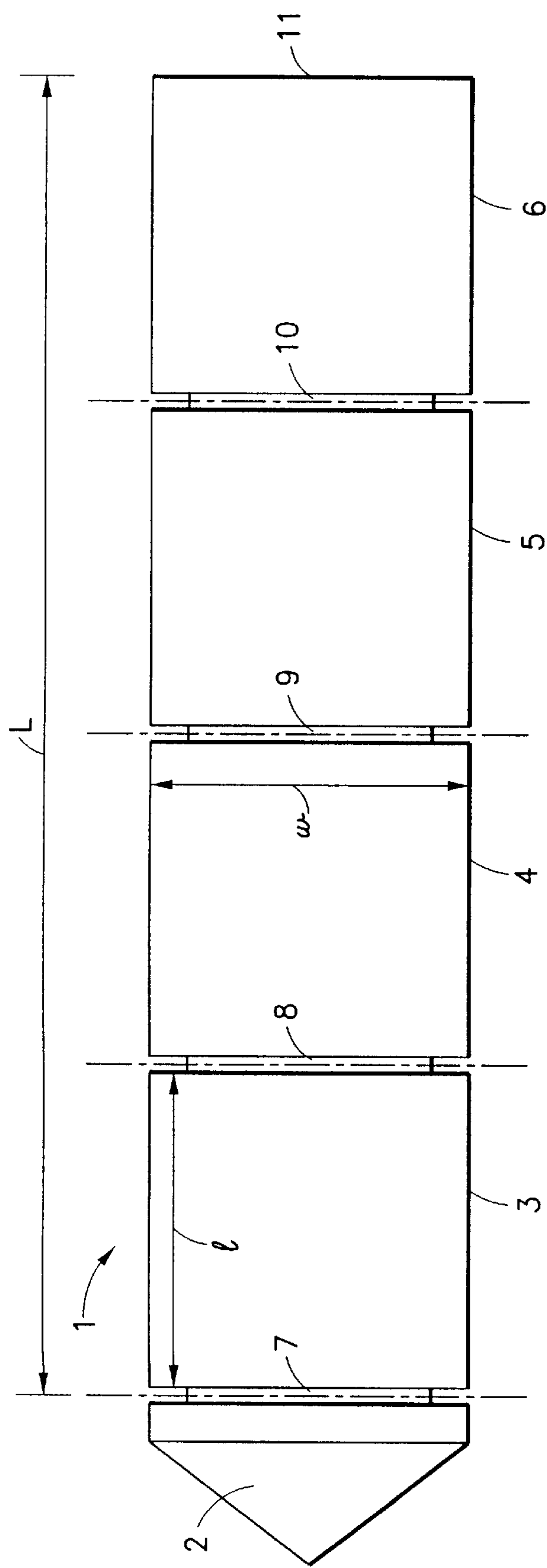
FIG. 1
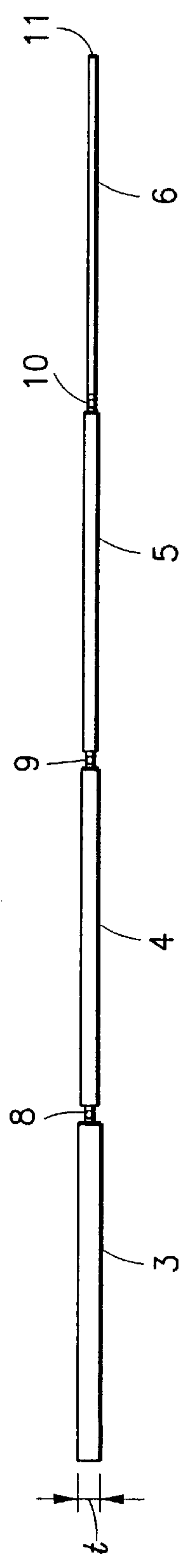
FIG. 2
FIG. 3
PRIOR ART 1
2
3
4
5
6
11
12
13
13

SOLAR PANEL ARRAY WITH STEPPED TAPER

BACKGROUND OF THE INVENTION

A solar array for a satellite is generally constructed of a series of flat panels which are structurally connected to each other by hinges and to the satellite by a yoke which incorporates a deployment mechanism. The hinged connection allows the panels to be folded in a secure and compact position for launching of the satellite. Once the satellite obtains orbit, the panels are unfolded to deploy the solar array. Each panel supports hundreds of individual cells bonded to a face of the panel to receive light from the sun and convert it to power to drive the satellite systems.

The design of each panel is complex in that it must provide structural integrity to the array, while providing other functions such as electric insulation, thermal conductivity and heat dissipation for the individual cells. When the array is deployed, significant moments are generated with each motion of the satellite. Such motions will occur often, as the attitude and orbit of the satellite is adjusted during normal station keeping functions. The stresses experienced by the panels, therefore are considerable and varied as the array flexes over its extended span. In particular, in solar arrays which are deployed after separation from the rocket, but before final orbit is achieved, a design limiting bending stress occurs when the main thruster is fired at apogee to optimize the orbit.

Each array has a harmonic motion depending on it dimensions, density and components which must be damped to prevent damage to the array. In addition, one of the key design criteria for all components of a satellite is weight and this necessarily plays an important role in the construction of the panels.

U.S. Pat. No. 5,614,033, which issued to Robinson et al, describes a honeycomb panel which provides a combination of structural integrity and a core that is an effective heat sink. U.S. Pat. No. 5,520,747 shows an array structure which utilizes reflective panels to increase the efficiency of the solar cells and provide structure to the panel in deployment.

Honeycomb sandwich structures, consisting of flat high strength outer surface layers and a cellular honeycomb core, have proved effective building elements for solar array panels. A specific honeycomb structure is described in the '033 patent cited above.

It is the purpose of this invention to provide a weight reduction of as much as twenty percent while distributing the stresses more evenly over the solar panel array.

SUMMARY OF THE INVENTION

A series of solar panels are assembled into an array for use as a source of solar power for a satellite. The array extends from a yoke which supports the array at its inner end to its tip at the outer end of the fully deployed span. Each span consists of multiple honeycomb sandwich panels interconnected in a manner that allows the array to be retracted for launching or extended for use. The panels are designed with diminishing thickness from the yoke to the tip to obtain a constant stress distribution. The panels are assembled to form a span having a stepped taper with each panel having a uniform thickness reduced a predetermined amount from its immediately inward neighbor.

DESCRIPTION OF THE DRAWING

The invention of this application is described in more detail below with reference to the Drawing in which:

FIG. 1 is a top view of the solar array of this invention;

FIG. 2 is a side view of the solar array of this invention;

FIG. 3 is a side view of the solar array of the prior art; and

DESCRIPTION OF THE PREFERRED EMBODIMENT

Figure 4:
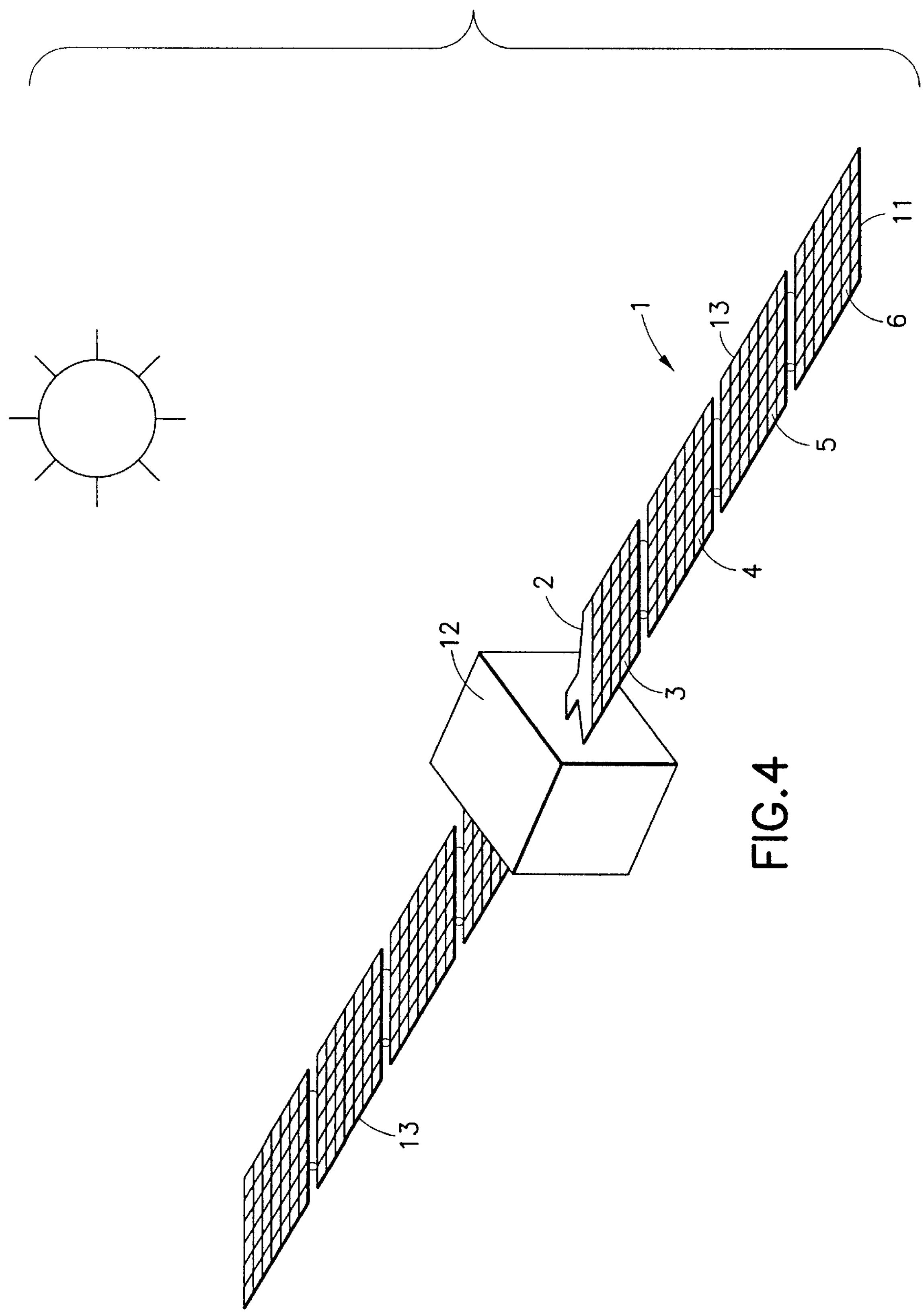
FIG. 4 is a perspective view of a satellite with a solar array deployed for operation.

The solar array 1 of this invention is shown in FIG. 4 fully deployed for operation to receive energy from the sun for conversion to electricity to power the systems of satellite 12. The array 1 is an assembly of structural panels 3 through 6 which are supported by a yoke 2 on satellite 12. Each of the panels 3, 4, 5, and 6 support many solar cells 13 appropriately connected to convert radiant energy from the sun to electric power.

As best shown in FIG. 1, each array extends from yoke 2 to tip 11 and comprises a span of interconnected panels 3, 4, 5, 6. The panels provide a substrate for the mounting of the solar cells 13 and their associated systems. The panels may be interconnected by hinges 7, 8, 9, and 10 which are constructed to allow each panel to be folded accordion style together in a secure and compact package during launching of the satellite. The yoke 2 may include mechanisms, such as those described in the '747patent referenced above, which will actuate the deployment of the array 2 and lock it in place when the satellite 12 has achieved its orbit.

Each substrate or panel is generally constructed of an inert material to provide an electrically insulated mounting pad for the solar cells 13. As suggested in the '033 patent, an outer skin of KEVLAR® polymer will provide both strength and rigidity and has been used effectively. High modulus graphite fiber with an appropriate insulating film may also be used. The outer skins generally enclose an aluminum honeycomb structure.

As shown in FIG. 2, the array 1 spans a length L and forms a significant moment which is dependent on the mass and density of the panels. Using known equations for modeling the stresses in a solar panel array, the moment at any section can be determined. The moment is a maximum at its inner end nearest the yoke 2. This maximizes the stress at the connections to the yoke leaving the rest of the structure of the array 1 under utilized for support.

The stresses in the array are related to the bending moment $M_x$ by the formula:

$$\sigma_x^k = -\frac{Q_{11}^k z M_x}{b D_{11}}$$

where $Q_{11}{}^k$ is the plane stress reduced stiffness, z is the transverse coordinate, and $D_{11}$ is the array bending stiffness derived from laminated plate theory. Accordingly the bending moment of a constant thickness array (the prior art) under inertial loading may be described by the formula:

$$M_x = -\frac{\rho g b h}{2}(L-x)^2$$

where ρ is the density of the array, g is the acceleration, b is the width of the array, h is the thickness of the array, L is the length, and x is the longitudinal coordinate. An inspection of these mathematical relations indicates that the stresses are a maximum at the cantilever root (x=0). This shows that with an array of uniform cross section the stresses will be maximized at the root of the array.

Using these calculations and other modeling algorithms, it can be shown that a constant stress distribution can be designed effectively with a tapered profile of the array. In order to facilitate the manufacture of the individual panels 3, 4, 5, and 6, the panels are constructed as shown in FIG. 2. The thickness (t) of each panel is reduced relative to the adjacent inner panel to simulate an array having a profile which is tapered from yoke 2 to tip 11. With a four panel design a starting thickness $t_3$=1 inch for panel 3 would be stepped down a quarter of an inch for each panel, i.e., $t_4$=¾ inches, $t_5$=½ inch, and $t_6$=¼ inches. In this manner the mass of the array is reduced by twenty percent, while the stress distribution is more nearly constant. The result is an improved stress response over the span of the array with a first natural frequency that is unchanged from an array having a uniform thickness.

I claim:

1. A solar panel array for providing power to a satellite comprising:

a series of interconnected panels assembled in an elongated planar span, said span connected at its inner end to the satellite and having an outer tip; wherein the first of said series of panels is positioned at the inner most portion of the span and is constructed with a first predetermined uniform thickness, and wherein each outward adjacent panel of the series is designed to provide a uniform distribution of stress along the length of the span.

2. A solar panel array for providing power to a satellite, as described in claim 1, wherein each outward adjacent panel has a uniform thickness which is reduced by a predetermined amount relative to said first uniform thickness and the thickness of the immediately inward adjacent panel, thereby constructing a thickness profile which is a stepped taper from the inner end to the outer tip of the span.

3. A method of constructing a solar array for powering a satellite wherein said array consists of a series of interconnected panels assembled in an elongated planar span having an inner end and an outer tip, said span being subject to stresses generated by forces acting over the moment arm formed by the span, comprising the steps of:

constructing a first panel having a planar shape and having a first predetermined thickness;

assembling said first panel to form the inner end of the span; and constructing a series of subsequent panels designed to provide a uniform distribution of stress along the length of the span; and assembling said subsequent panels sequentially together and to the first panel to extend from the inner end to the outer tip to provide said uniform stress distribution.

4. A method of constructing a solar array for powering a satellite, wherein said array consists of an elongated planar span having an inner end and an outer tip, said span being subject to stresses generated by forces acting over the moment arm formed by the span, as described in claim 3, wherein the step of constructing a series of subsequent panels designed to provide a uniform distribution of stress comprises the steps of:

constructing a series of subsequent panels each having a planar shape and having a predetermined thickness, said thickness being reduced by a predetermined amount relative to the first predetermined thickness; and wherein the step of assembling said subsequent panels sequentially together comprises the step of: assembling each of the subsequent panels together and to the first panel to form the span, each panel having a predetermined thickness, said thickness being reduced by a predetermined amount relative to the first predetermined thickness and relative to the thickness of the immediately inward adjacent panel, to form a thickness profile for the span, which is a stepped taper from the inner end to the outer tip of the span.

* * * * *